May 26, 1931. N. E. METHLIN 1,807,001
SYNCHRONOUS MOTOR
Filed Oct. 15, 1927
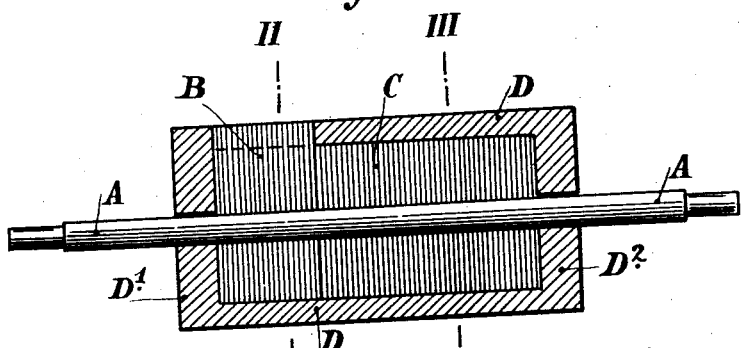
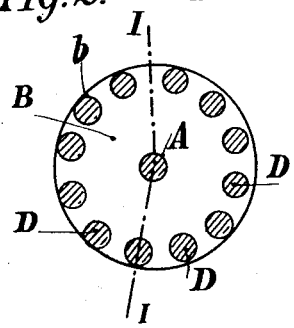 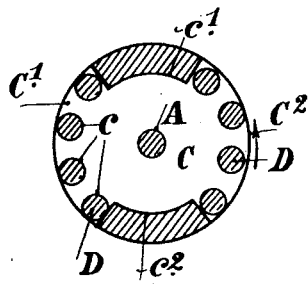
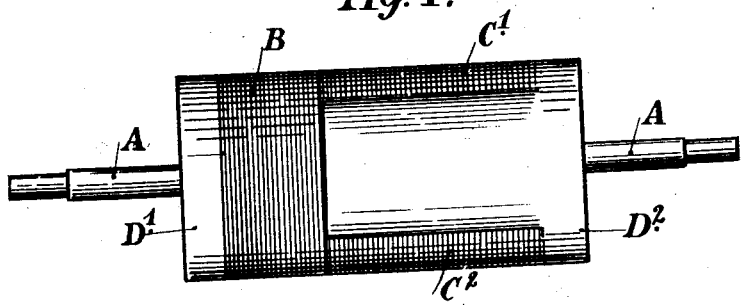
Inventor
Nicolas Emilien Methlin
By
Cameron, Kerkow & Sutton
Attorneys Patented May 26, 1931

1,807,001

UNITED STATES PATENT OFFICE

NICOLAS EMILIEN METHLIN, OF PARIS, FRANCE, ASSIGNOR TO SCHNEIDER & CIE., OF PARIS, FRANCE, A LIMITED JOINT STOCK COMPANY OF FRANCE

SYNCHRONOUS MOTOR

Application filed October 15, 1927, Serial No. 226,355, and in France November 17, 1926.

The synchronous motor which forms the subject of the present invention is characterized by the feature that it permits the two following results to be obtained at the same time, by novel and extremely simple means.

1. Starting is obtained automatically.
2. The amplitude of the pendular oscillations is rendered practically negligible.

Among the possible industrial applications of such a motor the following may be particularized:

The actuation of Baudot type telegraphs and machines known under the name of teletype machines; the actuation of all apparatus in which use is made of the stroboscopic method, and also the actuation of apparatus designed with a view to solving the problem of television.

The invention essentially consists in a special armature. The field magnet may be formed by the stator of an asynchronous motor of known type.

The armature essentially comprises the combination in a mixed member, of an asynchronous motor rotor and a synchronous motor armature.

The diagrammatic Figures 1, 2 and 3 in the accompanying drawings illustrate, by way of example and without constituting a limitation, a mode of constructing the mixed armature of a bipolar motor.

Fig. 1 is a longitudinal section taken along the axis of the motor, along the line I—I in Fig. 2.

Fig. 2 is a section along the line II—II in Fig. 1.

Fig. 3 is a section taken along the line III—III in Fig. 1.

Fig. 4 is a plan view.

In Figs. 1, 2 and 3, A is the shaft of the rotor; B designates the sheet metal discs in which are formed slots or perforations $b$; C designates sheet metal discs with perforations $c$ continuing the perforations $b$; these discs are notched at $c^1$ and $c^2$ in such a way that when they are assembled together they form two pole pieces $C^1$ and $C^2$. D, $D^1$, $D^2$ designate a squirrel cage which may be formed by casting a molten metal, for example aluminum, in a suitable mould, upon the magnetic frame of the rotor, the said metal forming the bars D of the cage by filling the perforations or slots $b$—$c$ and forming the ends $D^1$, $D^2$ of the said cage at the extremities of these bars.

Assuming in the first place that the motor is supplied by means of polyphase currents, it is then seen that starting as an asynchronous motor is obtained by the action of the rotating field upon the part which comprises the plates B, that synchronizing is produced by the driving of the pole pieces $C^1$ and $C^2$, and that the amplitude of any pendular oscillation is effectively limited by the energetic damping produced by the squirrel cage $D^1$—D—$D^2$.

In the case when the supply is made with the aid of a single phase current it will be sufficient, in order to produce the starting, to employ the known artifice which consists in giving the armature a slight initial impulse.

The bipolar motor described above may obviously be brought into step for two positions of the rotor spaced 180° apart. A motor with $2p$ poles may likewise be brought into step in $p$ positions of the rotor spaced $\frac{360°}{2p}$ apart.

Now, in numerous applications, it is necessary to obtain, upon a plurality of wheels each driven by a different motor, movements which will be at the same time synchronous and in phase, in such a way that reference lines traced along a radius on each of these different wheels always form between them equal angles whatever be the conditions of synchronizing of the motors which drive them.

This result may be obtained by interposing, between each motor and the corresponding wheel, a transmission gear giving the wheel a speed of rotation $2p$ times greater than that of the shaft of the motor.

In the case of a bipolar motor the difficulty may also be overcome by employing magnetic steel for the plates C, in order to be able to form a permanent magnet having its poles at $C^1$ and $C^2$; but, in order to avoid reversing the polarity it will then be necessary to provoke the starting under varying frequencies, by starting up gradually the common alternator employed for supplying the energy to the different motors.

The squirrel cage may for example, be formed by proceeding in the known manner, to rivet copper rods upon two rings of the same metal, or by making an electrolytic deposit; but, the method consisting in casting molten metal is the one which gives the best results, both from the point of view of economy in manufacture and as regards perfect conductivity of the arrangement.

The perforations or slots in the armature may be along straight lines parallel to the shaft or be curved so as to have a helical form.

When the supply is obtained by means of polyphase currents, it is preferable (on account of the special construction of the armature) to connect the coils in an arrangement comprising a neutral point, such as the commonly known Y-connection.

Claims:

1. In a synchronous motor, a rotor of magnetic material having axially related portions, one portion having substantially circular cross section, and another portion having polar projections formed thereon, and a squirrel cage winding extending substantially the length of said rotor.

2. In a synchronous motor, a rotor comprising a plurality of discs of magnetic material forming two axially related rotor sections, part of said discs forming a rotor section of substantially circular cross section, and the remainder of said discs being notched to form a rotor section having polar projections.

3. In a synchronous motor, a rotor comprising a plurality of discs of magnetic material forming two axially related rotor sections, part of said discs forming a rotor section of substantially circular cross section, and the remainder of said discs being notched to form a rotor section having polar projections, and a squirrel cage winding formed on said rotor.

4. In a synchronous motor, a rotor comprising a plurality of discs of magnetic material forming axially related rotor sections, part of said discs forming a rotor section of substantially circular cross section, and the remainder of said discs being notched to form a rotor section having polar projections, said discs being perforated, and a plurality of elements extending substantially the length of the rotor through said perforations to form a squirrel cage winding.

5. In a synchronous motor, a rotor comprising in a single member a section formed by a set of perforated discs of magnetic material and a section axially related to the first section and formed by discs of magnetic material which are perforated and notched so as to form pole pieces, and a squirrel cage comprising elements cast in said perforations in the magnetic frame of said rotor.

In testimony whereof I have signed this specification.

NICOLAS EMILIEN METHLIN.